METHOD FOR MAKING MEMORY STORAGE UNITS

Filed June 6, 1966 2 Sheets-Sheet 1

INVENTORS
JOSEPH W. BREAKFIELD
DAVID J. CRIMMINS
BY Kenyon & Kenyon
ATTORNEYS

METHOD FOR MAKING MEMORY STORAGE UNITS
Filed June 6, 1966 2 Sheets-Sheet 2
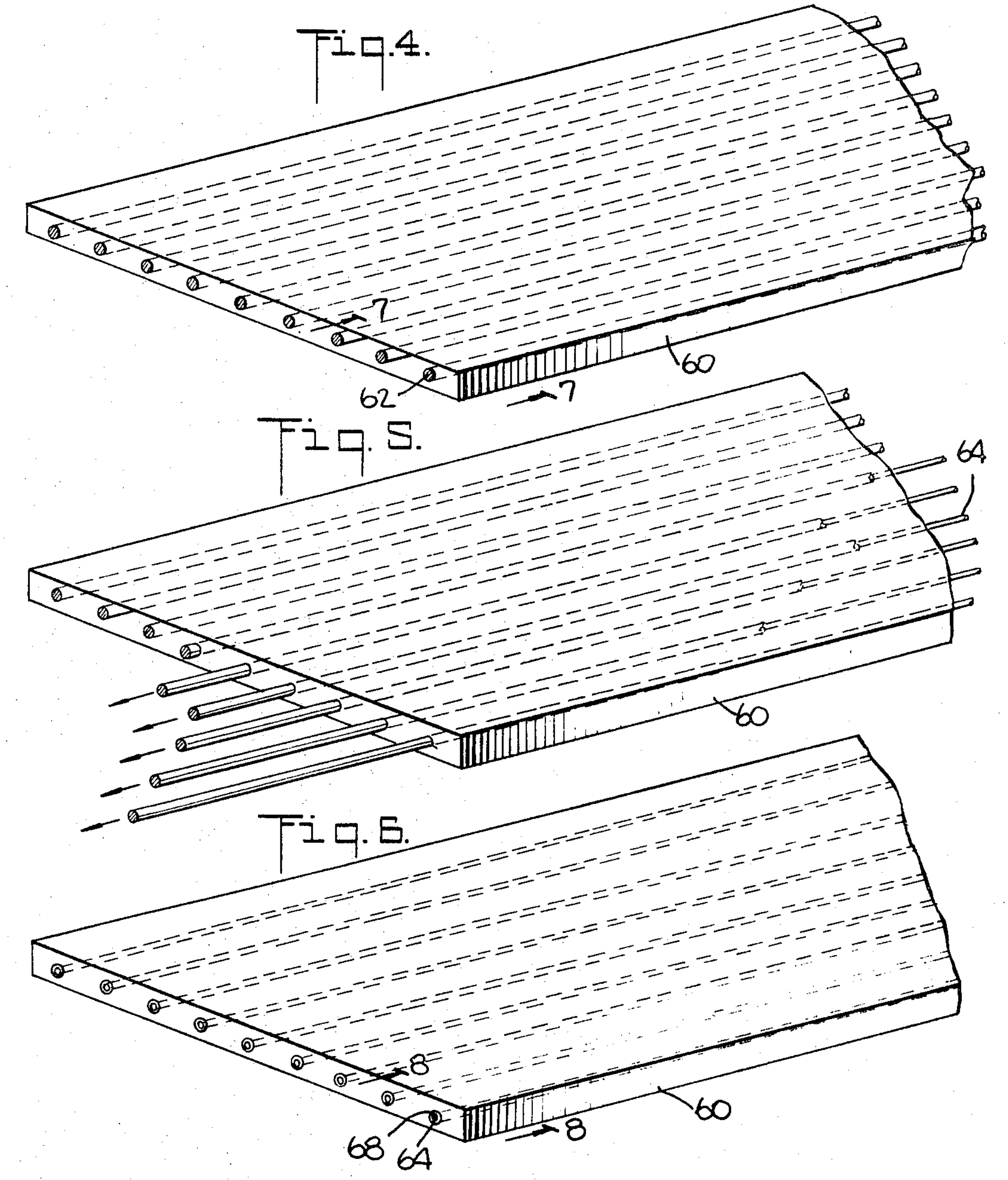
FIG. 4, FIG. 5, FIG. 6
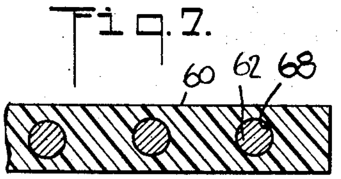
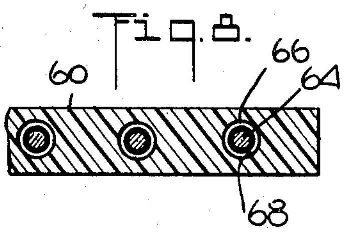
INVENTORS
JOSEPH W. BREAKFIELD
DAVID J. CRIMMINS
BY
Kenyon & Kenyon
ATTORNEYS United States Patent Office 3,465,432

Patented Sept. 9, 1969

3,465,432
METHOD FOR MAKING MEMORY STORAGE UNITS

David J. Crimmins, Pennington, N.J., and Joseph W. Breakfield, Doylestown, Pa., assignors to Thomas & Betts Corporation, a corporation of New Jersey Filed June 6, 1966, Ser. No. 555,421
Int. Cl. B23p *17/00;* H01f *7/06*
U.S. Cl. 29—604 8 Claims

ABSTRACT OF THE DISCLOSURE

A method of making a memory storage unit comprising the steps of embedding a plurality of spaced elongated elements such as wires within a supporting medium, removing the elongated elements to form parallelly spaced holes, and inserting wires have a coating of magnetic material into the holes in the medium. In a preferred method, a laminate is formed by embedding a plurality of parallel wires between two sheets of material which are bonded together and the wires are then removed to form parallel holes within the laminate.

This invention relates to a new and improved method for making memory storage units for computers or the like, and more particularly to a new and improved method for making memory storage units which utilize wire coated with magnetic material for storage of information.

In the development of computer technology there has been increasing attention shown to the memory storage unit of the computer. As the demands on computer versatility and capacity have increased, so have the demands on increased storage capacity of the memory storage unit increased. One solution for increasing the information or "bit" capacity of computer memory units has been the use of wire coated with magnetic material supported in an insulating medium. In such applications, however, difficulties have arisen in providing a suitable supporting medium for the wires. Some types of wire coated with magnetic material have the characteristic that a sharp drop in magnetic properties of the wire is experienced if it is bent or otherwise altered in physical form. In memory storage units utilizing such wires it is also desirable that the spacing between adjacent wires be as small as possible in order to increase the storage capacity of the memory unit. Maintaining accurate spacing between adjacent wires is very difficult due to the small diameter of such wires. These factors have made it very difficult to provide a suitable means for supporting the wires within an insulating medium. Previous attempts to support a plurality of parallel wires in a plastic sheet by milling slots in the sheet to accept the wires have proven unsuccessful due to the difficulty in satisfying exacting manufacturing tolerances.

It is thus an object of the present invention to provide a new and improved method for making memory storage units that is simple and economical.

It is a further object of the present invention to provide a new and improved method for making memory storage units that utilize wires coated with magnetic material for storage of information.

It is yet another object of the present invention to provide a new and improved method for making an insulated supporting medium for wires coated with magnetic material that maintains the magnetic and physical properties of the magnetic coating of the wires.

It is still another object of the present invention to provide a new and improved method for making an insulated supporting medium for wires coated with magnetic material that satisfies exacting manufacturing tolerances.

It is yet another object of the present invention to provide a new and improved method for making an insulated supporting medium for wires coated with magnetic material that maintains the wires in a stress-free condition and that facilitates removal and replacement of wires which are defective.

Other and further objects will become evident from the following description and drawings wherein:

FIG. 4 is a perspective view of a segment of insulated supporting medium used in a preferred method of the present invention;

FIG. 5 is a perspective view showing the insulated supporting medium of FIG. 4 with hole-producing wires being removed from the insulated medium and wires coated with magnetic material being pulled into the holes formed in the insulated medium by the removal of the hole-forming wires;

FIG. 6 is a perspective view showing the insulated supporting medium of FIG. 4 after the wires coated with magnetic material have been inserted therein;

FIG. 7 is a partially sectional view taken along line 7—7 of FIG. 4, and

FIG. 8 is a partially sectional elevational view taken along line 8—8 of FIG. 6.

Figures 1, 2, 3:
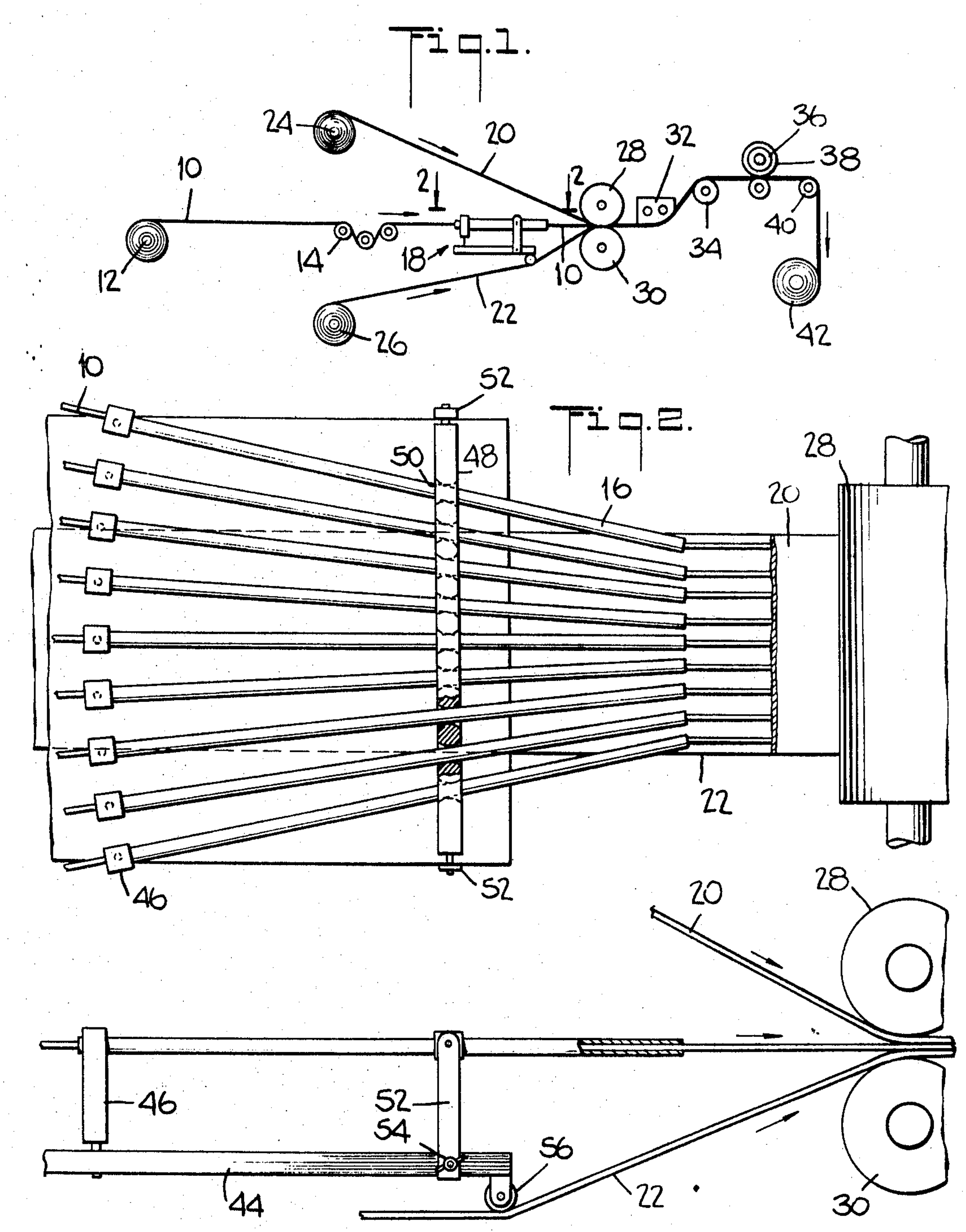
FIG. 1 is an elevational schematic view of one apparatus for forming an insulating medium which may be utilized in the method of the present invention.
FIG. 2 is a partially sectional top plan view taken along line 2—2 of FIG. 1.
FIG. 3 is a partially sectional elevational view of the apparatus of FIG. 2.

In general, the method for making memory storage units of the present invention contemplates the forming of a plurality of parallelly spaced holes in an insulated supporting medium and the insertion of wires coated with magnetic material into the holes formed in said medium. In a preferred method, first a laminate is formed comprising a plurality of parallel hole-forming wires embedded within and between two sheets of insulating material, the hole-forming wires are removed from the laminate to form a plurality of parallelly spaced holes and wires coated with magnetic material of lesser diameter than the diameter of the hole-forming wires are inserted into said holes. By subjecting the hole-forming wires to a pulling force, the wires are elongated. This elongation causes a reduction in their overall diameter, thus allowing easy removal of the wires from the laminate. Wires coated with magnetic material which are of lesser diameter than the holes produced in the laminate may be attached to the ends of the hole-forming wires so that they are pulled into the laminate while the hole-forming wires are removed therefrom or they may be inserted in any other convenient manner. This difference in diameter between the wires coated with magnetic material and the holes formed in the laminate allows insertion of the wires without stretching or other deformation thereof. Application of a release agent to the hole-forming wires prior to formation of the laminate facilitates removal thereof.

Referring now to the figures, there will be described a preferred method for making the memory storage unit of the present invention. FIG. 1 shows one form of apparatus which may be used for making a laminate utilized in this preferred method. As shown, a plurality of hole-forming wires 10 coiled up on reels 12 are passed between tensioning rolls 14. Individual wires 10 are fed into tubes 16 of positioning mechanism 18, hereinafter to be described in greater detail. Wires 10 are fed between insulating sheets 20 and 22 respectively rolled up on reels 24 and 26 into the nip of rolls 28 and 30. Depending upon the nature of insulating sheets 20 and 22, rolls 28 and 30, by means of suitable pressure and/or heat, cause the bonding together of sheets 20 and 22 about wires 10 to form a cohesive strip of insulating material having wires imbedded therein which are insulated from each other. If, for example, sheets 20 and 22 are of thermoplastic material, it is desirable that either or both rolls 28 and 30 be heated so that through the application of pressure and heat, rolls 28 and 30 cause thermoplastic sheets 20 and 22 to become bonded to one another while encasing individual wires 10.

After bonding of the insulating sheets, a cooling shoe 32 may be provided to cool the insulating material. The bonded strip may then be passed over idler roll 34 and slit into strips by means of slitting machine 36, machine 36 comprising a plurality of cutting blades 38. The bonded strip may then be passed over a roll 40 and wound up on take-up reels 42.

Referring now to FIGURES 2 and 3, there is shown in greater detail the positioning mechanism 18 of FIG. 1. As shown, individual wires 10 are threaded through tubes 16. Tubes 16 are pivotally mounted at one thereof to base plate 44 by means of posts 46 journalled in base plate 44. Tubes 16 are further supported by means of a horizontal bar 48 having a plurality of slots 50 milled therein adapted to carry tubes 16. Bar 48 is mounted on base plate 44 by suitable vertical brackets 52 which are secured to plate 44 by means of suitable screws 54 or the like. Base plate 44 is further provided with idler roll 56 over which insulating sheet 22 passes. The spacing between individual wires 10 may be varied by moving bar 48 in a horizontal plane. Thus, if bar 48 is moved towards pivot posts 46, the opposite ends of tubes 16 will be forced closer together, thereby decreasing the spacing between individual wires 10. Conversely, if bar 48 is moved away from pivot posts 46, the spacing between opposite ends of tubes 16 will be increased, and the spacing between individual wires 10 will also be increased.

By use of the apparatus described hereinabove, an insulated supporting medium having any desired spacing between magnetically coated wires may be produced while satisfying rigid tolerance specifications for such spacing.

Referring now to FIGS. 4–8, FIG. 4 shows a segment of laminate 60 having a plurality of hole-forming wires 62 embedded therein. Laminate 60 may be formed by the apparatus of FIGS. 1–3 or by any other suitable apparatus. If the apparatus of FIGS. 1–3 is used, individual segments of laminate may be severed from the longer laminate strip rolled up on take-up reels 42. In any case, it is desirable that a portion of the insulation be removed from both ends of a wire 62 so that at one end, a magnetically coated wire may be attached thereto, while at the other end the wire may be gripped by a suitable tool or the like for removal of the wire from the laminate.

As shown in FIG. 5, secured to one end of wires 62 are wires 64 having a magnetic coating 66. Wires 62 are removed from laminate 60 by subjecting them to a pulling force which tends to elongate them. Elongation of an individual wire 62 as it is removed from laminate 60 causes a decrease in the overall diameter of the wire 62, thus freeing the wire for easy removal from the laminate. At the same time, a hole 68 is created in laminate 60, the hole having a diameter substantially equal to the original diameter of wire 62. A suitable release agent may be applied to wire 62 before lamination in order to facilitate removal. As wire 62 is removed from laminate 60, a wire 64 secured at one end thereto, is pulled into the hole 68 formed by wire 62. Since the diameter of the wire having a magnetic coating is less than the diameter of hole 68, wire 64 is easily drawn into hole 68 without physical deformation of wire 64. FIG. 6 shows laminate 60 after wires 64 have been inserted into holes 68 created by the removal of wires 62.

The relationship of the diameter of wire 62 to the diameter of magnetically coated wire 64 is shown more clearly by referring to FIGS. 7 and 8. FIG. 7 shows the diameter of wire 62 as being substantially equal to the diameter of hole 68 created by the removal of wire 62 from laminate 60. On the other hand, FIG. 8 shows the diameter of wire 64 to be sufficiently less than the diameter of hole 68 so as to allow easy insertion of wire 64 therein.

Although a preferred method has been described hereinabove, it will be understood that other methods for making a magnetic storage unit utilizing wires coated with magnetic material are contemplated within the scope of the present invention. Thus, insulation material could be molded about a plurality of spaced wires by known molding techniques to produce an insulated supporting medium from which the wires could then be withdrawn to produce holes within the medium. Wires coated with magnetic material could then be inserted into the holes thus formed by either securing them to the hole-forming wires as described hereinabove, or by separately inserting them into the holes after removal of the hole-forming wires. It will be also understood that neither the manner of removal of the hole-forming wires from the insulated supporting medium nor the manner of insertion of the magnetically coated wires is critical to the method of the present invention and any technique of removal or insertion, well known to those skilled in the art, may be utilized. Thus the hole-forming wires may be removed manually, by means of a suitable hand tool or automatically by a suitable machine. Similarly, the wires having a magnetic coating may be inserted by hand, by use of a suitable tool or by automatic means. Similarly, the manner of forming the insulated material about a plurality of spaced wires is not critical and, as described hereinabove, laminating, molding, or the like techniques may be used. Any suitable wire coated with magnetic material may be inserted into the supporting medium. As used hereinabove, the term hole-forming "wire" is not limited to any specific material and such term embraces any suitable material such as metal, plastic or the like. It is preferable that such material elongate upon being stretched to facilitate easy removal but materials which do not readily elongate may also be used, in which case it is preferable that they be coated with a release agent or the like to facilitate removal.

Although a preferred method of the present invention has been described hereinabove, it will be understood that other methods readily apparent to those skilled in the art are contemplated to be within the scope of this invention. Therefore, this invention is not limited by the above description and drawings but rather by the following appended claims.

What is claimed is:

1. A method of making a memory storage unit having spaced wires having a coating of magnetic material comprising the steps of forming a non-magnetic supporting medium having a plurality of spaced holes by embedding a plurality of spaced hole-forming wire-like elements within a non-magnetic sheet and removing said elements to form spaced holes within the sheet and the step of inserting wires having a coating of magnetic material into said holes in said medium.

2. The method of claim 1 wherein said hole-forming wire-like elements are treated with a release agent before being embedded in said non-magnetic sheet.

3. The method of claim 1 wherein individual wires having a coating of magnetic material are secured to individual hole-forming elements and wherein a wire having a coating of magnetic material is inserted into a hole formed in said sheet while a hole-forming element is removed from said sheet.

4. The method of claim 1 wherein said wires having a coating of magnetic material have diameters less than the diameters of the spaced holes formed by removal of said elements.

5. A method of making a memory storage unit comprising the steps of positioning a plurality of spaced hole-forming wire-like elements between two sheets of non-magnetic material, bonding said sheets so as to form a cohesive sheet supporting said plurality of elements, removing said elements from said sheet to form a plurality of spaced holes in said sheet and inserting wires having a coating of magnetic material into said holes in said supporting sheet.

6. The method of claim 5 wherein said wires having a coating of magnetic material are attached to said hole-forming elements and are drawn into the holes formed by said elements as the latter are removed from said supporting sheet.

7. The method of claim 5 wherein said wires having a coating of magnetic material are of lesser diameter than the diameters of said holes formed in said supporting sheet.

8. The method of claim 5 wherein said hole-forming elements are removed from said supporting sheet by exerting a pulling force on said elements thereby to elongate them and consequently reduce their diameter and to reduce the friction between said elements and said supporting sheet.

References Cited

UNITED STATES PATENTS

| | | | |
|---|---|---|---|
| 771,594 | 10/1904 | Wilhelmi | 128—111 X |
| 3,082,292 | 3/1963 | Gore | 156—55 X |
| 3,183,567 | 5/1965 | Riseman et al. | 29—604 |
| 3,311,901 | 3/1967 | Fedde et al. | 340—174 |

FOREIGN PATENTS

| | | |
|---|---|---|
| 833,958 | 5/1960 | Great Britain. |

OTHER REFERENCES

Schlenker: Mounting for Magnetic Memory Cores, RCA Technical Note No. 190.

JOHN F. CAMPBELL, Primary Examiner

D. C. REILEY, Assistant Examiner

U.S. Cl. X.R.

29—423; 156—55; 264—334